(12) United States Patent
De Pelsemaeker et al.

(10) Patent No.: US 11,970,059 B2
(45) Date of Patent: Apr. 30, 2024

(54) INTERACTIVE SYSTEM

(71) Applicant: Valeo Systemes Thermiques, Le Mesnil Saint-Denis (FR)

(72) Inventors: Georges De Pelsemaeker, Le Mesnil Saint Denis (FR); Antoine Boilevin, Le Mesnil Saint Denis (FR); Hamid Bessaa, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 356 days.

(21) Appl. No.: 17/420,868

(22) PCT Filed: Jan. 6, 2020

(86) PCT No.: PCT/FR2020/050012
§ 371 (c)(1),
(2) Date: Jul. 6, 2021

(87) PCT Pub. No.: WO2020/144424
PCT Pub. Date: Jul. 16, 2020

(65) Prior Publication Data
US 2022/0063408 A1 Mar. 3, 2022

(30) Foreign Application Priority Data
Jan. 7, 2019 (FR) .................... 1900118

(51) Int. Cl.
*B60K 35/00* (2006.01)
*B60H 3/00* (2006.01)
(Continued)

(52) U.S. Cl.
CPC .......... *B60K 35/00* (2013.01); *B60H 3/0007* (2013.01); *B60Q 3/80* (2017.02); *B60K 35/25* (2024.01); *B60K 35/26* (2024.01)

(58) Field of Classification Search
CPC .............. B60K 35/00; B60K 2370/157; B60K 2370/158; B60H 3/0007; B60Q 3/80;
(Continued)

(56) References Cited

U.S. PATENT DOCUMENTS 7,431,120 B2  10/2008 Pollehn et al.
10,398,342 B2 * 9/2019 Tupin, Jr. ................ G01S 13/88
(Continued)

FOREIGN PATENT DOCUMENTS

CN 106293383  *  1/2017
CN 106652378 A    5/2017
(Continued)

OTHER PUBLICATIONS

Anonymous : "Emotion classification-Wikipedia", Nov. 28, 2018 (Nov. 28, 2018), XP055638709, retrived from internet : https://en.wikipedia.org/w/index.php?title=Emotion_classification&oldid=871066882.*
(Continued)

*Primary Examiner* — Muhammad Shafi
(74) *Attorney, Agent, or Firm* — Osha Bergman Watanabe & Burton LLP (57) ABSTRACT

The invention relates to a system for interacting with an occupant of a motor vehicle comprising: a. a measuring device comprising at least one sensor arranged to acquire at least one parameter associated with the occupant of said vehicle; b. an on-board processing unit arranged to receive said parameter and to define a data item representing the emotional state of said occupant by means of said model, said representative data item being a comfort index score (CISn) of said occupant; c. the representative data item corresponding to a point in a two-dimensional space (anvn) for characterising the emotional state of the occupant; d. characterised in that an emotional comfort index is com-
(Continued)

puted on the basis of the representative data item; e. and in that at least one actuator is configured to activate at least one multi-sensory stimulus for interacting with the occupant, said stimulus allowing the emotional state of said occupant to be changed.

9 Claims, 6 Drawing Sheets

(51) Int. Cl.
*B60Q 3/80* (2017.01)
*B60K 35/25* (2024.01)
*B60K 35/26* (2024.01)

(58) Field of Classification Search
CPC .... G06F 3/015; G06F 2203/011; G06F 3/016; G06F 3/011; B60W 2540/22
USPC ........................................................... 701/36
See application file for complete search history.

(56) References Cited

U.S. PATENT DOCUMENTS

| | | |
|---|---|---|
| 2012/0143391 A1 | 6/2012 | Gee |
| 2015/0048178 A1 | 2/2015 | Edwards et al. |
| 2016/0104486 A1* | 4/2016 | Penilla .................... G10L 15/02 704/232 |
| 2016/0132490 A1* | 5/2016 | Lee ......................... G06F 40/30 704/9 |
| 2016/0196105 A1 | 7/2016 | Vartakavi et al. |
| 2018/0052964 A1 | 2/2018 | Adelson |
| 2018/0225551 A1 | 8/2018 | Lin et al. |

FOREIGN PATENT DOCUMENTS

| | | |
|---|---|---|
| DE | 102015200775 A1 | 7/2016 |
| JP | 2008068664 A | 3/2008 |
| KR | 20040014123 A | 2/2004 |

OTHER PUBLICATIONS

Anonymous. "Emotion classification—Wikipedia" Nov. 28, 2018, p. 3, paragraph 1; XP055638709; Retrieved from the Internet: URL:https://en.wikipedia.org/w/index.php?title=Emotion_classification &oldid=871066882 (8 pages).
International Search Report with Written Opinion in corresponding International Application No. PCT/FR2020/050012, dated May 20, 2020 (15 pages).
Office Action issued in European Application No. 20705404.0 dated Feb. 8, 2023 (3 pages).
Office Action issued in counterpart Chinese Patent Application No. CN 202080007703.0 mailed Nov. 16, 2023 (20 pages).

* cited by examiner

INTERACTIVE SYSTEM

The invention relates to an interactive system which interacts with an occupant of a motor vehicle. The invention also relates to a method for interacting with an occupant of a motor vehicle.

The transition to autonomous automobiles is presenting more and more challenges with regard to creating an empathetic vehicle that will allow driving and/or the journey to be made more pleasant. The progress still to be made may be categorized into three areas encompassing safety, comfort and entertainment.

Some examples of existing systems allow the emotional state of an occupant of a motor vehicle to be evaluated. Specifically, it is known practice to carry out measurements allowing various parameters relating to an occupant to be determined, and thus an item of data representative of his emotional state to be derived therefrom.

In general, the measurements may be carried out with the aid of wearable devices allowing data such as the conductivity of the skin, temperature, or indeed heart rate to be collected. The system that is used comprises, if possible, a camera, for example a GoPro® camera or even a webcam. Such a device makes it possible to perform facial recognition of the occupant and thus adapt the interactive system.

In known systems, the parameters that are obtained are then used to determine the emotional state of the occupant. One known model consists in obtaining, on the basis of the various parameters, a map of the emotional state of the passenger. Said passenger may thus for example be represented by a point in a two-dimensional space formed by an x-axis corresponding to valence (intrinsically pleasant or unpleasant quality of a stimulus or of a situation) and a y-axis corresponding to arousal (strength of the emotional stimulus).

The invention aims to improve the known systems by proposing an interactive system that allows the emotional state of an occupant of a vehicle to be evaluated by using an emotional index that makes it possible to easily determine the one or more stimuli to be applied to said occupant and thus have an impact on the safety and/or comfort and/or entertainment of the one or more occupants of the vehicle.

One subject of the invention is an interactive system which interacts with an occupant of a motor vehicle, comprising:
- a measurement device comprising at least one sensor designed to acquire at least one parameter linked to the occupant of said vehicle,
- an on-board processing unit designed to receive said parameter and define an item of data representative of the emotional state of said occupant by means of said model,
- the representative item of data corresponding to a point in a two-dimensional space for characterizing the emotional state of the occupant.

This invention is noteworthy in that an emotional comfort index is calculated from the representative item of data and that at least one actuator is configured to activate at least one multisensory stimulus in order to interact with the occupant, said stimulus allowing the emotional state of said occupant to be modified.

According to one aspect of the invention, the emotional comfort index may be calculated using the formula: $CI = [\sum_1^n CIS_n]/n$, CI being the emotional comfort index and CISn being a score of the comfort index determined at a time n.

According to one aspect of the invention, the score of the comfort index is a function of valence and of arousal.

According to another aspect of the invention, the score of the comfort index is calculated using the following formula:

$$CIS_n = \frac{v_n + (3 \times a_n)}{2},$$

$v_n$ being valence and $a_n$ being arousal, $CIS_n$ being a comfort index score determined at a time n.

According to one aspect of the invention, n is between 10 milliseconds and 300 milliseconds.

According to another aspect of the invention, the values of the comfort index score are collected for a duration of between 0.1 seconds and 30 seconds, particularly 0.1 seconds and 5 seconds.

According to another aspect of the invention, the sensors are formed by at least one ultra-wideband radar and an infrared camera.

According to one aspect of the invention, the ultra-wideband radar has a frequency between 10 GHz and 1 THz, in particular between 50 GHz and 160 GHz.

According to one aspect of the invention, the infrared camera detects wavelengths between 0.7 µm and 100 µm, in particular between 25 µm and 100 µm.

According to one aspect of the invention, the at least one multisensory stimulus is a perfume and/or essential oils and/or a nebulizer and/or lighting and/or a sound and/or music and/or a vibration and/or a massage and/or an air flow and/or light.

According to one aspect of the invention, the interactive system has a learning loop allowing the processing of the model for evaluating emotion to be improved.

According to one aspect of the invention, the learning loop makes it possible to create a database.

According to one aspect of the invention, the interactive system comprises at least one display means, particularly a user interface.

According to one aspect of the invention, the at least one display means may be a wearable device, in particular a watch and/or glasses and/or a bracelet and/or a belt and/or a shirt.

According to one aspect of the invention, the at least one display means may be a text and/or a color and/or a sound and/or a vibration.

According to one aspect of the invention, the representative item of data is preprocessed before activating the at least one multisensory stimulus.

According to one aspect of the invention, the representative item of data placed in the 3D space will be correlated with one or more maps corresponding to various stimuli.

According to one aspect of the invention, the preprocessing consists in taking account of supplementary data, in particular the culture and/or the education of the occupant and/or the personal experience and life of said occupant and/or age and/or gender and/or type of clothing.

According to one aspect of the invention, the supplementary data may be determined by means of an autonomous measurement system allowing air quality and/or pollution and/or microparticles and/or allergens and/or the sound environment and/or the light environment and/or temperature and/or humidity level to be measured.

According to one aspect of the invention, the evaluation model is created by means of artificial intelligence.

According to one aspect of the invention, the multisensory stimulus allows the emotional state of the occupant to be modified.

According to one aspect of the invention, the multisensory stimulus allows the emotional state of the occupant to be remediated.

According to one aspect of the invention, the multisensory stimulus allows the emotional state of the occupant to be amplified.

According to one aspect of the invention, the at least one sensor may be chosen from: a camera, in particular a far-infrared and/or near-infrared and/or visible-range camera, a microphone, a wearable device, a sensor installed in the vehicle, in particular a conductive element placed in a seat and/or in a steering wheel and/or in an armrest.

According to one aspect of the invention, the interactive system may comprise at least a far-infrared camera, a plurality of sensors for detecting vital signs and a microphone.

The invention also relates to a method for interacting with an occupant of a motor vehicle, comprising the steps of:
measuring a parameter linked to an occupant of a vehicle by means of at least one sensor,
analyzing the parameter by means of a processing unit and determining an item of data representative of the emotional state of the occupant, this item of data corresponding to a comfort index score,
calculating an emotional comfort index from said comfort index score,
actuating an actuator so as to activate at least one multisensory stimulus in order to interact with the occupant, said stimulus allowing the emotional state of said occupant to be modified in order to interact with said occupant on the basis of the emotional comfort index.

The interactive system proposed in the invention uses a method having five steps. These five steps, which are shown schematically in [FIG. 1], consist of:
a) a measurement step M carried out by a measurement device and during which one or more parameters relating to the one or more occupants are collected,
b) an analysis step A for mapping the emotional state of the occupant,
c) a calculation step C in which an emotional comfort index CI is determined,
d) an action step Ac in which at least one multisensory stimulus is applied so as to modify the emotional state of the one or more occupants. The one or more stimuli are chosen on the basis of the value of the emotional comfort index CI calculated in the previous step,
e) an optional information step Inf in which the occupant is informed of his emotional state and of the stimuli applied.

Figure 1:
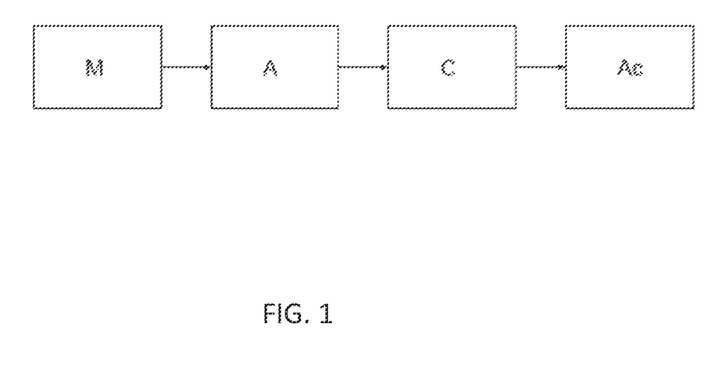
FIG. 1 is a schematic diagram of at least part of the method according to the invention.
Figure 2:
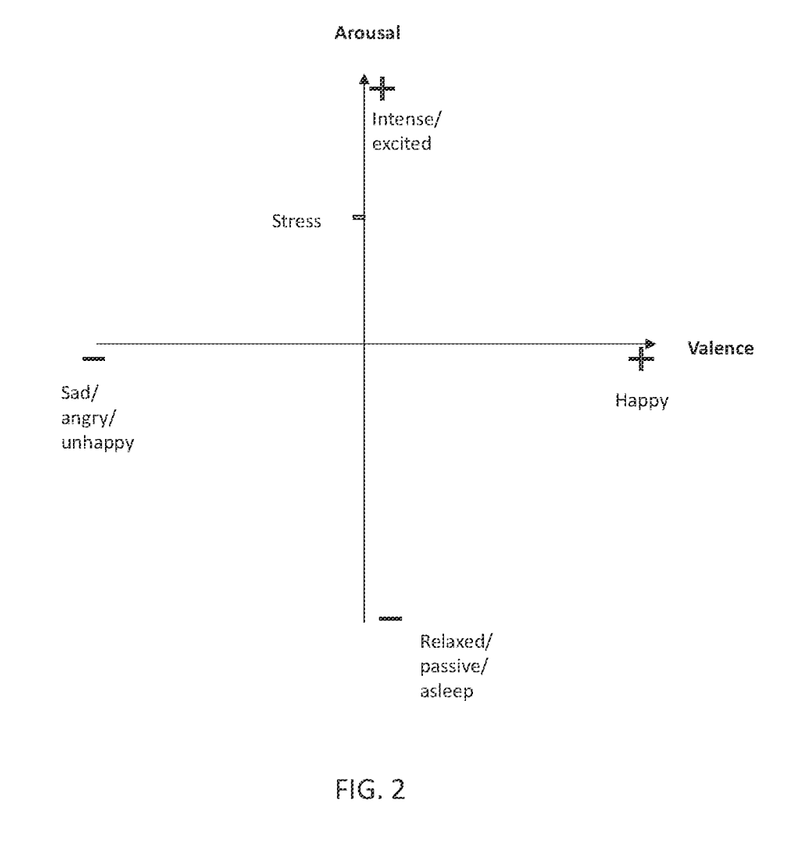
FIG. 2 is a schematic depiction of a two-dimensional space AV used in one of the steps of the method of FIG. 1.

In the measurement step M, the measurement device will acquire one or more parameters describing the status and therefore the emotional state of the occupant (what is described for one occupant may of course be applied to a plurality of occupants of the vehicle simultaneously). Parameters describing the environment in which the occupant finds himself may also be collected so as to deduce therefrom their potential effect on the emotional state of the occupant.

The device described in the preceding paragraphs is formed by one or more sensors. These sensors are preferably sensors built into the vehicle, such as for example one or more cameras, sensors for detecting vital signs, one or more microphones or indeed contact sensors.

In one preferred embodiment, the measurements are carried out by cameras, in particular infrared cameras which take images in the infrared domain. These cameras are directed toward the expected positions of the various occupants of the vehicle: the driver's seat, passenger seat, rear bench seat, etc. In particular, one or more very wide-angle cameras (for example of the "fisheye" type) may cover a plurality of positions simultaneously. The infrared cameras preferably detect wavelengths between 0.7 µm and 100 µm, preferably 25 µm and 100 µm.

These cameras comprise, advantageously, near-infrared (NIR) cameras and/or far-infrared (FIR) cameras.

The images from the near-infrared cameras may for example serve to delimit the position, dimensions and movements of various parts of the body of an occupant of the vehicle. The images from the far-infrared cameras may for example serve to identify the parts of the body of the occupant exchanging the most heat with the vehicle interior, for example the head and hands, which are not covered with clothes and will thus appear hotter. The FIR and RGB NIR cameras may be fused in order to better identify a fixed location on the more precise RGB camera and follow it on the FIR camera.

The images from the near-infrared cameras may for example serve to delimit the position, dimensions and movements of various parts of the body of an occupant of the vehicle. The images from the far-infrared cameras may for example serve to identify the parts of the body of the occupant exchanging the most heat with the vehicle interior, for example the head and hands, which are not covered with clothes and will thus appear hotter.

As explained above, the measurement device also allows the environment of the one or more passengers to be determined, the environment possibly influencing their emotional state. Thus, data such as temperature, luminous intensity, noise, the speed of the vehicle, etc. will possibly be collected.

Other types of parameters will also be collected by means of other sensors.

The measurement device comprises at least one microphone allowing the voice of the one or more passengers to be recorded.

The measurement device may also comprise biosensors able to detect parameters such as organic compounds, ions, bacteria, etc.

The measurement device may also be composed of sensors for detecting vital signs. These may for example take the form of contactless sensors such as for example a radar, a camera, or indeed wearable elements (watch, shirt, bracelet, etc.).

Sensors for detecting vital signs in contact with the passenger may also be used. They take for example the form of conductive elements installed in parts of the vehicle (armrest, steering wheel, seat, etc.). These sensors for detecting vital signs measure parameters such as heart rate and/or frequency, breathing frequency and/or amplitude, the conductivity of the skin, brain waves, etc.

One preferred embodiment uses an ultra-wideband short-range radar. The frequency of the radar may for example be between 10 GHz and 1 THz, preferably between 50 GHz and 160 GHz.

The following analysis step A consists in evaluating and interpreting the parameters obtained in the measurement step M. These parameters will thus be translated into a representative item of data easily represented in a two-dimensional space or 2D space $a_n v_n$ for characterizing the emotional state. This 2D space is shown in [FIG. 3]. It is formed of a first axis corresponding to valence $v_n$ and of a second axis corresponding to arousal an.

Valence characterizes the level of pleasure or unpleasantness associated with an emotion while arousal may be defined as being the intensity of the impacts and of the response generated by this emotion.

The individual's state of control may also be assessed from measurements performed on the vehicle. Reference is then made to dominance. The space that is used is then a three-dimensional space and no longer a two-dimensional space.

Figure 3:
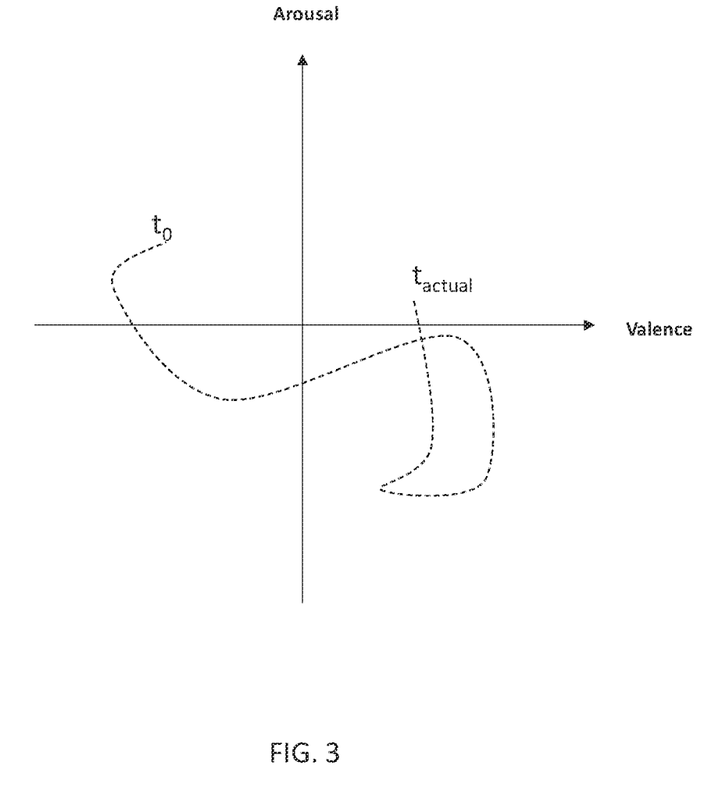
FIG. 3 is a schematic depiction of the analysis step of the method of FIG. 1.

[FIG. 3] illustrates the placement of the representative item of data described above in the two-dimensional space $a_n v_n$. This item of data varies over the course of the time spent by the occupant in the vehicle. Thus, a first representative item of data is provided for a time $t_0$ while the representative item of data corresponding to the present is illustrated by $t_{actual}$. Continuous measurements are preferably carried out, so as to obtain the curve shown in [FIG. 3]. However, discrete measurements may also be performed.

The emotional state of the occupant according to the placement of the representative item of data on the 2D space $a_n v_n$ may then be given.

Figure 4:
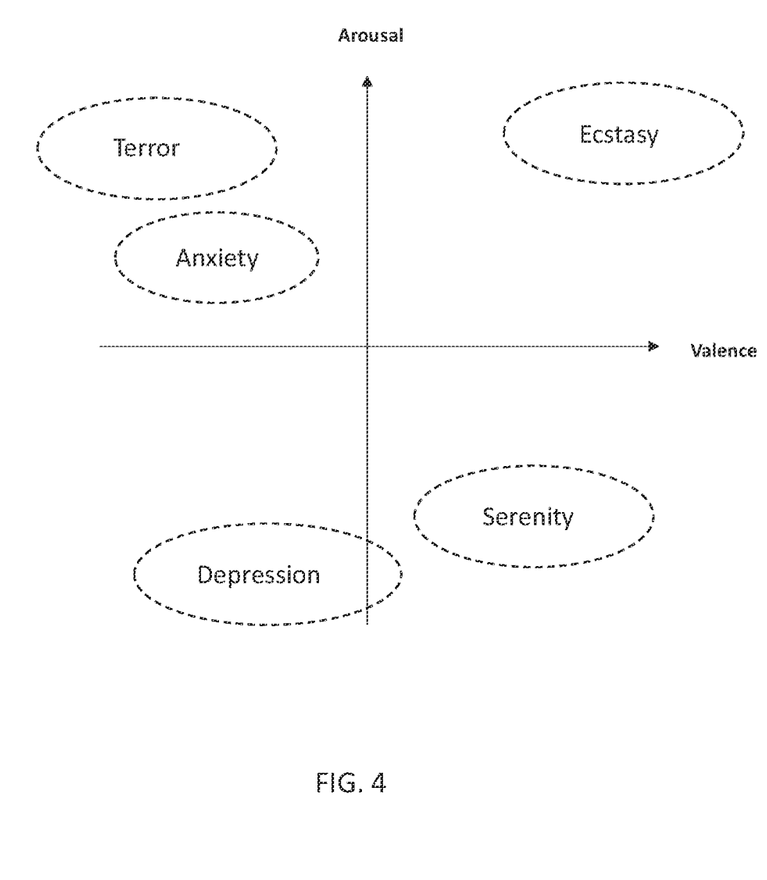
FIG. 4 is a schematic depiction of the analysis step of the method of FIG. 1.
Figure 5:
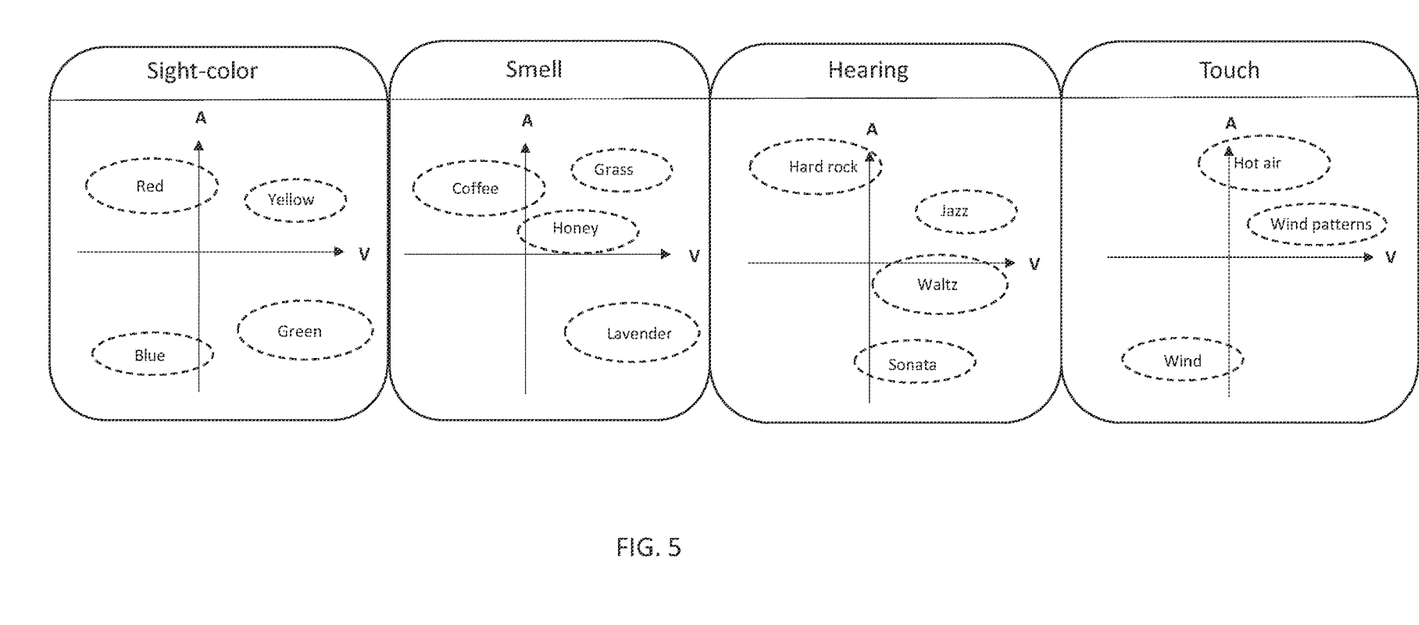
FIG. 5 is a schematic depiction of the multisensory map used in the method of FIG. 1.

One example of the previously described map is shown in [FIG. 4]. This map of the emotional state of the occupant will then be correlated with one or more maps corresponding to various stimuli. These stimuli are based on the five senses: sight, smell, taste, touch, hearing. The maps corresponding to each of the five senses are shown in FIG. 5.

Figure 6:
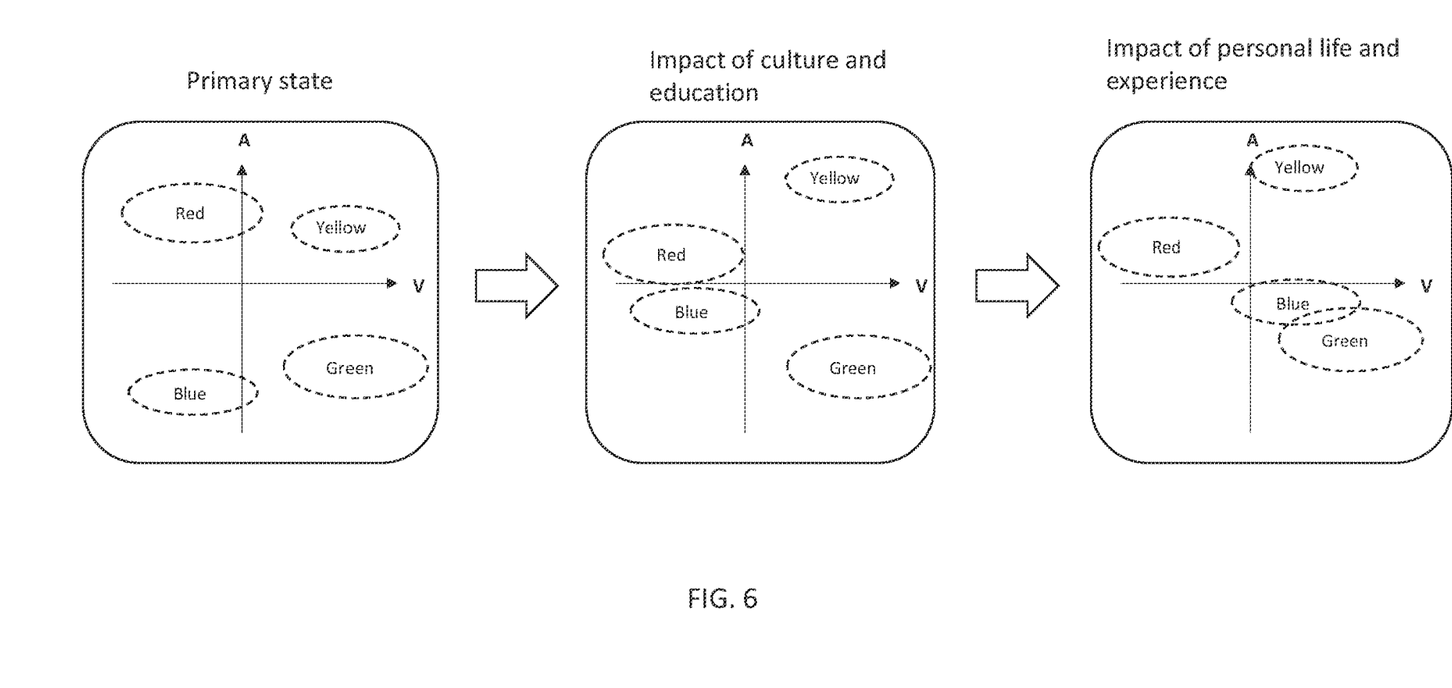
FIG. 6 is a schematic depiction of the construction of the map of FIG. 5.

The map of the five senses is created in three steps, which are illustrated in [FIG. 6]. Specifically, the initial settings of the vehicle may be described as being those corresponding to the primary emotional state of the occupant, that is to say an emotional state in which the occupant primarily reacts.

The map is then modified to take account of the impact of the culture and/or of the education of the occupant. This step may, for example, be carried out by deep learning, allowing a user profile to be obtained for each occupant.

The last step in the construction of the map relates to the impact of the personal life and/or of the experience of the occupant. This step is preferably performed by machine learning, thus allowing the map to be adjusted in real time.

The calculation step C of calculating the emotional comfort index CI is performed using a plurality of measurements of the score of the comfort index $CIS_n$, that are able to be deduced from the representative item of data described above, and therefore from the values of valence $v_n$ and of arousal $a_n$ at a given time.

The score $CIS_n$ is calculated from a function whose variables are valence $v_n$ and arousal $a_n$, respectively representing the positive or negative experience of the occupant, as well as the importance of said experience.

The score of the comfort index $CIS_n$ may be calculated using the following formula:

$$CIS_n = \frac{v_n + (3 \times a_n)}{2},$$

wherein $v_n$ is valence and $a_n$ is arousal.

However, the score of the comfort index $CIS_n$ may be calculated using a more complex formula dependent on valence $v_n$ and arousal $a_n$.

The emotional comfort index CI may then be calculated from the average of various scores $CIS_n$ calculated for given times. This may be deduced from the following formula:

$$CI = \frac{\left[\sum_1^n CIS_n\right]}{n},$$

wherein CI is the emotional comfort index and CISn is the score of the comfort index obtained at a time n.

A plurality of successive evaluations, preferably evaluations that are carried out discretely, are performed based on measurements performed in the vehicle over a duration that may for example be between 0.1 sec and 5 sec. The sampling period may for example be between 10 milliseconds and 300 milliseconds.

The action step Ac shown in [FIG. 1] corresponds to the application of one or more stimuli. The choice of the stimulus depends on the desired effect. After having calculated the emotional comfort index as explained above, various types of action may be selected.

The multisensory stimuli used may, for example, be:
a) For sight: use of interior lighting with various colors and/or of various intensities,
b) For smell: use of a diffuser of perfume, essential oils or indeed pheromones,
c) For touch: use of radiant panels, nebulization of water, use of jets of hot and/or cold air,
d) For hearing: selection of ambient noises or music,
e) For taste: diffusion of perfume or nebulization possibly creating pheromones combining the five main flavors (savory, sour, bitter, sweet, umami).

There may be display means allowing the occupant to be informed of his emotional state. The interactive system may have one or more display means. Said means may for example take the form of a wearable or portable device, in particular a watch and/or glasses and/or a bracelet and/or a belt and/or a shirt and/or a mobile telephone.

The display means may also take the form of a text and/or a color and/or a sound and/or a vibration.

The invention claimed is:
1. An interactive system which interacts with an occupant of a motor vehicle, comprising:
   a measurement device comprising at least one sensor configured to acquire at least one parameter linked to the occupant of said vehicle,
   an on-board processing unit configured to receive said parameter and define an item of data representative of the emotional state of said occupant by said model, said representative item of data being a comfort index score of said occupant,
   the representative item of data corresponding to a point in a two-dimensional space for characterizing the emotional state of the occupant,
   wherein an emotional comfort index is calculated from the representative item of data, wherein the emotional comfort index (CI) is calculated using the formula:

$$CI = \left[\sum_{1}^{n} CIS_n\right]/n$$

CI being the emotional comfort index and $CIS_n$ being a score of the comfort index determined at a time n, and at least one actuator is configured to activate at least one multisensory stimulus in order to interact with the occupant, said stimulus allowing the emotional state of said occupant to be modified.

2. The interactive system as claimed in claim 1, wherein the score of the comfort index is a function of valence and of arousal.

3. The interactive system as claimed in claim 1, wherein the score of the comfort index is calculated using the following formula:

$$CIS_n = \frac{v_n + (3 \times a_n)}{2}$$

4. The interactive system as claimed in claim 1, wherein the sensors are formed by at least one ultra-wideband radar and an infrared camera.

5. The interactive system as claimed in claim 1, wherein the ultra-wideband radar has a frequency between 50 GHz and 160 GHz.

6. The interactive system as claimed in claim 1, wherein the infrared camera detects wavelengths between 25 µm and 100 µm.

7. The interactive system as claimed in claim 1, wherein the at least one multisensory stimulus is at least one selected from the group consisting of: a perfume, essential oils, a nebulizer, lighting, a sound, music, a vibration, a massage, an air flow and light.

8. The interactive system as claimed in claim 1, further comprising a learning loop allowing the processing of the model for evaluating emotion to be improved.

9. A method for interacting with an occupant of a motor vehicle, comprising:
measuring a parameter linked to an occupant of a vehicle by at least one sensor;
analyzing the parameter by means of a processing unit and determining a score of the comfort index of the emotional state of the occupant;
calculating an emotional comfort index from the score of the comfort index, wherein the emotional comfort index (CI) is calculated using the formula:

$$CI = \left[\sum_{1}^{n} CIS_n\right]/n$$

CI being the emotional comfort index and $CIS_n$ being a score of the comfort index determined at a time n; and
actuating an actuator so as to activate at least one multisensory stimulus in order to interact with the occupant, said stimulus allowing the emotional state of said occupant to be modified in order to interact with said occupant on the basis of the emotional comfort index.

* * * * *